(12) United States Patent
Wu (10) Patent No.: US 10,609,533 B2
(45) Date of Patent: Mar. 31, 2020

(54) METHOD AND DEVICE FOR TRIGGER MANAGEMENT OF A COMMON SERVICE ENTITY (CSE) AND A NETWORK ELEMENT OF BEARER NETWORK

(71) Applicant: ZTE Corporation, Shenzhen (CN)

(72) Inventor: Hao Wu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 811 days.

(21) Appl. No.: 15/113,718

(22) PCT Filed: Apr. 21, 2014

(86) PCT No.: PCT/CN2014/075852
§ 371 (c)(1),
(2) Date: Apr. 11, 2017

(87) PCT Pub. No.: WO2015/109670
PCT Pub. Date: Jul. 30, 2015

(65) Prior Publication Data
US 2017/0237826 A1  Aug. 17, 2017

(30) Foreign Application Priority Data
Jan. 22, 2014  (CN) .......................... 2014 1 0030545

(51) Int. Cl.
G06F 15/177  (2006.01)
H04W 4/70  (2018.01)
H04L 29/08  (2006.01)

(52) U.S. Cl.
CPC ............... *H04W 4/70* (2018.02); *H04L 67/12* (2013.01); *H04L 67/322* (2013.01); *H04L 67/325* (2013.01)

(58) Field of Classification Search
USPC ......................................................... 709/220
See application file for complete search history.

(56) References Cited

U.S. PATENT DOCUMENTS 8,565,100 B2 * 10/2013 Jokimies ................. H04W 4/38
370/242
8,605,704 B2 * 12/2013 Swamy ................. H04W 68/12
370/312
(Continued)

FOREIGN PATENT DOCUMENTS

CN  102137105 A  7/2011
CN  102158911 A  8/2011
(Continued)

OTHER PUBLICATIONS

International Search Report dated Dec. 8, 2014 re: Application No. PCT/CN2014/075852; pp. 1-2; citing: CN 103249084 A, CN 102781068 A, CN 102404825 A.
(Continued)

*Primary Examiner* — Alicia Baturay
(74) *Attorney, Agent, or Firm* — Cantor Colburn LLP (57) ABSTRACT

The disclosure provides a method and device for trigger management of a CSE, the CSE and a network element of a bearer network. The method includes that: the CSE sends a trigger request to a network element of a bearer network, wherein the trigger request carries the following information: a trigger message, an external identifier of the CSE, an identifier of a triggered device and a resource identifier of a trigger resource corresponding to the trigger request; the CSE receives a trigger response, which corresponds to the trigger request, sent by the network element of the bearer network; and the CSE updates a first attribute of the trigger resource according to the trigger response. Thus, the technical problem in the related art that M2M communication (Continued)

does not provide a solution of correspondingly triggering connection between a device and a service layer server yet is solved.

20 Claims, 4 Drawing Sheets

(56) References Cited

U.S. PATENT DOCUMENTS

| | | | | |
|---|---|---|---|---|
| 8,818,946 B2* | 8/2014 | Foti | ...................... | H04W 4/70 707/632 |
| 8,943,132 B2* | 1/2015 | Foti | ...................... | H04L 67/24 709/204 |
| 9,107,179 B2* | 8/2015 | Park | ...................... | H04W 4/70 |
| 9,148,452 B2* | 9/2015 | Dietz | ................... | H04L 65/104 |
| 9,167,517 B2* | 10/2015 | MacKenzie | ............. | H04W 4/70 |
| 9,363,839 B2* | 6/2016 | Zhao | ...................... | H04W 28/24 |
| 9,392,571 B2* | 7/2016 | Ahn | ...................... | H04W 4/70 |
| 9,590,935 B2* | 3/2017 | Huang | .................... | H04L 51/12 |
| 9,615,346 B2* | 4/2017 | Kim | ...................... | H04W 4/70 |
| 9,717,027 B2* | 7/2017 | Ahn | ...................... | H04L 12/66 |
| 9,723,429 B2* | 8/2017 | Choi | ...................... | H04L 67/26 |
| 9,769,801 B2* | 9/2017 | Kim | ................ | H04W 72/0406 |
| 9,814,012 B2* | 11/2017 | Wu | ...................... | H04W 60/04 |
| 9,887,821 B2* | 2/2018 | Seok | ................ | H04W 52/0216 |
| 9,894,166 B2* | 2/2018 | Wu | ...................... | H04W 4/70 |
| 9,894,457 B2* | 2/2018 | Dong | ...................... | H04W 4/70 |
| 9,930,632 B2* | 3/2018 | Wu | ...................... | H04L 67/32 |
| 10,015,684 B2* | 7/2018 | Park | ...................... | H04W 24/02 |
| 10,057,173 B2* | 8/2018 | Seed | ................... | H04L 67/1017 |
| 10,070,408 B2* | 9/2018 | Yang | ...................... | H04W 8/24 |
| 10,079,893 B2* | 9/2018 | Wu | ...................... | H04W 24/04 |
| 10,104,492 B2* | 10/2018 | DiGirolamo | ............ | H04L 67/12 |
| 10,129,739 B2* | 11/2018 | Yu | ........................... | H04W 4/70 |
| 10,182,415 B2* | 1/2019 | Yang | ...................... | H04W 4/70 |
| 10,200,353 B2* | 2/2019 | Seed | ...................... | H04W 4/70 |
| 10,231,107 B2* | 3/2019 | Wu | ...................... | H04W 4/70 |
| 10,257,800 B2* | 4/2019 | Kim | ...................... | H04W 4/70 |
| 2011/0299492 A1 | 12/2011 | Lee | | |
| 2017/0099562 A1* | 4/2017 | Bhalla | ................. | H04L 41/0803 |
| 2018/0124576 A1* | 5/2018 | Yang | ...................... | H04W 4/08 |
| 2018/0242177 A1* | 8/2018 | Wu | ...................... | H04W 24/10 |

FOREIGN PATENT DOCUMENTS

| | | |
|---|---|---|
| CN | 102404825 A | 4/2012 |
| CN | 102781068 A | 11/2012 |
| CN | 103249084 A | 8/2013 |
| WO | 2013061614 A2 | 5/2013 |

OTHER PUBLICATIONS

Written Opinion Report dated Dec. 8, 2014 re: Application No. PCT/CN2014/075852; pp. 1-6; citing: CN 103249084 A.

3rd Generation Partnership Project; Technical Specification Group Services and System Aspects; Architecture enhancements to facilitate communications with packet data networks and applications; 3GPP TS 23.682 V12.0.0 (Dec. 2013), Internet: URL: http://www.3gpp.org, XP050728780.

European Search Report for corresponding application EP14880273: Report dated Dec. 13, 2016.

* cited by examiner

METHOD AND DEVICE FOR TRIGGER MANAGEMENT OF A COMMON SERVICE ENTITY (CSE) AND A NETWORK ELEMENT OF BEARER NETWORK

TECHNICAL FIELD

The disclosure relates to the communications field, and in particular to a method and device for trigger management of a Common Service Entity (CSE), a CSE and a network element of a bearer network.

BACKGROUND

A Machine Type Communication (MTC) network also called a Machine to Machine (M2M) communication network, is composed of each M2M nodes and a bearer network. M2M nodes intercommunicate via the bearer network. Each M2M node at least contains an application or a CSE.

The M2M nodes can be divided, according to different functions, into two classes: nodes which contain at least one CSE and nodes which do not contain CSEs. Each of the nodes which do not contain CSEs includes:

an application exclusive node which must have at least one application and does not contain CSEs.

Each of the nodes which contain CSEs includes:

an application service node which must have at least one application and a CSE and corresponds to a terminal device physically;

an intermediate node which must have at least one CSE, can have at least one application, corresponds to a gateway device physically, and is responsible for managing a terminal device connected with a gateway and manages a connection between a terminal and a service provision server; and an infrastructure node which must have at least one CSE, can have at least one application, serves as the service provision server at a network side physically, and provides management and service support for the terminal device and the gateway device.

A basic M2M service provider is usually configured with an infrastructure node, a plurality of intermediate nodes and a plurality of service application nodes.

Figure 1:
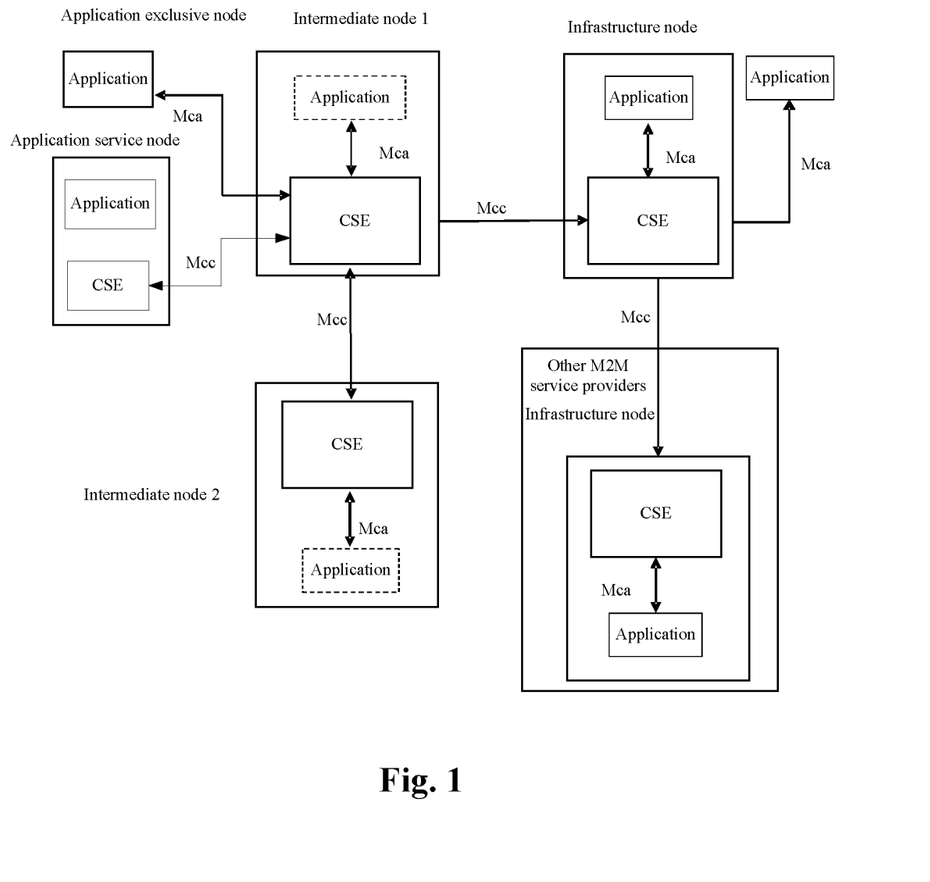
FIG. 1 is a schematic diagram of a principle of interaction between a CSE and an M2M application according to the related art.

Communication between M2M applications is implemented by interaction between CSEs, the M2M applications are connected to the CSEs via Mca interfaces, the CSEs communicate via Mcc interfaces on the premise that the M2M applications need to register on local CSEs firstly, and the interaction between the M2M applications can be implemented by means of the communication between the CSEs, as shown in FIG. 1.

When a service layer server needs to communicate with an application on a certain device (the application service node or the application exclusive node), the device shall be triggered to initiate a connection with the service layer server. However, a corresponding trigger solution is not provided in the related art.

SUMMARY

The embodiments of the disclosure provide a method and device for trigger management of a CSE, a CSE and a network element of a bearer network, which are intended to solve the technical problem in the related art that M2M communication does not provide a solution of correspondingly triggering connection between a device and a service layer server yet.

To this end, according to one embodiment of the disclosure, a method for trigger management of a CSE is provided, which may include:

sending, by a CSE, a trigger request to a network element of a bearer network, wherein the trigger request carries the following information: a trigger message, an external identifier of the CSE, an identifier of a triggered device and a resource identifier of a trigger resource corresponding to the trigger request; receiving, by the CSE, a trigger response, which corresponds to the trigger request, sent by the network element of the bearer network; and updating, by the CSE, a first attribute of the trigger resource according to the trigger response.

In an example embodiment, before the CSE sends the trigger request to the network element of the bearer network, the method includes: creating, by the CSE, the trigger resource, and setting, by the CSE, the first attribute for the trigger resource, wherein the first attribute includes at least one of: the identifier of the triggered device, the resource identifier of the trigger resource, a trigger status of the trigger resource.

In an example embodiment, the first attribute further includes at least one of: validity time of the trigger message in the bearer network, a priority indicator of the trigger message, and backoff time for re-sending the trigger message.

In an example embodiment, the method further includes: creating, by the CSE, a trigger policy resource, and setting, by the CSE, a second attribute for the trigger policy resource, wherein the trigger policy resource is a common resource of the trigger resource, and the second attribute includes: validity time of the trigger message in the bearer network, a priority indicator of the trigger message, and backoff time for re-sending the trigger message.

In an example embodiment, the trigger response carries the following information: the resource identifier of the trigger resource and a request status.

In an example embodiment, updating, by the CSE, the first attribute of the trigger resource according to the trigger response includes: when the request status indicates success, setting, by the CSE according to the resource identifier, the trigger status as being confirmed by the bearer network or backoff-for-trigger; and when the request status indicates that a sending frequency of the trigger message exceeds a standard or when the request status indicates network overloading, setting, by the CSE according to the resource identifier, the trigger status as backoff-for-trigger.

In an example embodiment, the method further includes: when the trigger status is backoff-for-trigger and the first attribute includes backoff time, starting, by the CSE, a timer, and when the timer reaches the backoff time, re-sending, by the CSE, the trigger request.

In an example embodiment, updating, by the CSE, the first attribute of the trigger resource according to the trigger response includes: setting, by the CSE according to the resource identifier, the trigger status as failure when the request status indicates one of the following information: a temporary error, an invalid load, an invalid device identifier, an invalid CSE identifier, non-authorized, invalid validity time, service unavailability and quota exceeding.

In an example embodiment, updating, by the CSE, the first attribute of the trigger resource according to the trigger response includes: when the request status indicates success, updating, by the CSE, the first attribute according to a received trigger sending report sent by the network element of the bearer network.

In an example embodiment, the trigger sending report carries the following information: the resource identifier of the trigger resource and a sending result of the trigger message.

In an example embodiment, updating, by the CSE, the first attribute according to the received trigger sending report sent by the network element of the bearer network includes: when the sending result indicates success, setting, by the CSE, the trigger status as success.

In an example embodiment, setting, by the CSE, the first attribute according to the received trigger sending report sent by the network element of the bearer network includes: setting, by the CSE, the trigger status as failure when the sending result indicates one of the following information: expiration of the trigger message, a temporary error and incapability of sending.

In an example embodiment, the method further includes: when the trigger status is set as failure, deleting, by the CSE, the trigger resource or re-sending the trigger request.

In an example embodiment, the trigger request further carries at least one of the following information: validity time and a priority indicator.

In an example embodiment, the method further includes: after the trigger status changes, sending, by the CSE, a notification message to an Application Entity (AE).

In an example embodiment, the resource identifier of the trigger resource includes one of: a reference number, and a name of the trigger resource, wherein the reference number is a set of serial numbers used for uniquely identifying the trigger resource.

To this end, according to another embodiment of the disclosure, a method for trigger management of a CSE of a service layer is also provided, which may include that:

receiving, by a network element of a bearer network, a trigger request from a CSE, wherein the trigger request carries the following information: a trigger message, an external identifier of the CSE, an identifier of a triggered device and a resource identifier of a trigger resource corresponding to the trigger request; and sending, by the network element of the bearer network, a trigger response corresponding to the trigger request to the CSE, wherein the trigger response is used for updating a first attribute of the trigger resource.

In an example embodiment, the first attribute includes at least one of: a device identifier of the triggered device, the resource identifier of the trigger resource, a trigger status of the trigger resource.

In an example embodiment, the trigger response carries the following information: the resource identifier of the trigger resource and a request status.

To this end, according to another embodiment of the disclosure, a device for trigger management of a CSE is also provided, which may be applied to the CSE and may include:

a sending component, configured to send a trigger request to a network element of a bearer network, wherein the trigger request carries the following information: a trigger message, an external identifier of the CSE, an identifier of a triggered device and a resource identifier of a trigger resource corresponding to the trigger request; a receiving component, configured to receive a trigger response, which corresponds to the trigger request, sent by the network element of the bearer network; and an updating component, configured to update a first attribute of the trigger resource according to the trigger response.

In an example embodiment, the method further includes: a creation component, configured to create the trigger resource, and set the first attribute for the trigger resource, wherein the first attribute includes at least one of: the identifier of the triggered device, the resource identifier of the trigger resource, a trigger status of the trigger resource.

To this end, according to another embodiment of the disclosure, a device for trigger management of a CSE is also provided, which may include:

a receiving component, configured to receive a trigger request from a CSE, wherein the trigger request carries the following information: a trigger message, an external identifier of the CSE, an identifier of a triggered device and a resource identifier of a trigger resource corresponding to the trigger request; and a sending component, configured to send a trigger response corresponding to the trigger request to the CSE, wherein the trigger response is used for updating a first attribute of the trigger resource.

To this end, according to another embodiment of the disclosure, a CSE is also provided, which may include the above device for trigger management applied to the CSE.

To this end, according to another embodiment of the disclosure, a network element of a bearer network is also provided, which may include the above device for trigger management.

By means of the embodiments of the disclosure, in a technical way that a CSE sends a trigger request to a network element of a bearer network and sets an attribute of a trigger resource according to a trigger response fed back by the network element of the bearer network, the technical problem in the related art that M2M communication does not provide a solution of correspondingly triggering connection between a device and a service layer server yet is solved, thereby achieving the device trigger management of a service layer.

BRIEF DESCRIPTION OF THE DRAWINGS

The drawings illustrated herein are intended to provide further understanding of the disclosure, and form a part of the disclosure. The schematic embodiments and illustrations of the disclosure are intended to explain the disclosure, and do not form improper limits to the disclosure. In the drawings.

DETAILED DESCRIPTION OF THE EMBODIMENTS

The disclosure will be illustrated below with reference to the drawings and the embodiments in detail. It needs to be noted that the embodiments of the disclosure and the characteristics in the embodiments can be combined under the condition of no conflicts.

In the related art, when a service layer server needs to communicate with an application on a certain device (such as an application service node or an application exclusive node), the device shall be triggered to initiate a connection with the service layer server. However, a management solution of correspondingly triggering the connection is not provided in the related art. The following embodiments provide a corresponding solution for the problem. It needs to be noted that a CSE, which may be a functional entity of a service layer device, is configured to send a trigger message for triggering the connection via a bearer network, and the service layer device is not limited to the service layer server.

Figure 2:
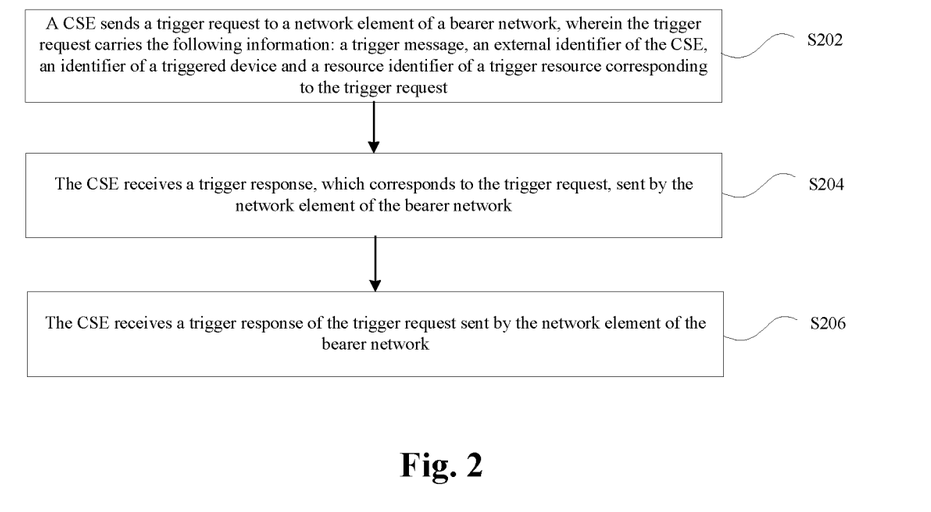
FIG. 2 is a flowchart of a method for trigger management of a CSE according to an embodiment of the disclosure.

FIG. 2 is a flowchart of a method for trigger management of a CSE according to an embodiment of the disclosure. As shown in FIG. 2, the method includes Step S202 to Step S206 as follows.

Step 202: A CSE sends a trigger request to a network element of a bearer network, and the trigger request carries the following information: a trigger message, an external identifier of the CSE, an identifier of a triggered device (which may be a device identifier of a physical device where an application triggered to communicate with the CSE is located), and a resource identifier of a trigger resource corresponding to the trigger request. In the embodiment, the trigger resource may be, but is not limited to, a resource used for triggering an establishment of a connection between the CSE and the physical device. Optionally, the trigger request further carries at least one of the following information: validity time of the trigger message and a priority indicator of the trigger message. The trigger resource here may be a resource or may be a set of a plurality of resources used for triggering message management.

Step S204: The CSE receives a trigger response, which corresponds to the trigger request, sent by the network element of the bearer network.

Step S206: The CSE updates a first attribute of the trigger resource according to the trigger response. A definition updated herein may be expressed as, but is not limited to, the following forms: assignment, modification and the like.

In the embodiment, before Step S202, the CSE also needs to create the trigger resource and to set the first attribute for the trigger resource, and the first attribute includes, but is not limited to, the following information: the identifier of the triggered device (which may be the device identifier of the physical device where the application triggered to communicate with the CSE is located), the resource identifier of the trigger resource and a trigger status of the trigger resource.

Optionally, the first attribute may further include, but is not limited to, at least one of: validity time of the trigger message in the bearer network, a priority indicator of the trigger message, and backoff time for indicating to re-send the trigger message.

In the embodiment, the CSE may also create a trigger policy resource and set a second attribute for the trigger policy resource, wherein the trigger policy resource is a common resource of the trigger resource, and the second attribute includes: validity time of the trigger message in the bearer network, a priority indicator of the trigger message, and backoff time for indicating to re-send the trigger message.

The trigger response carries the following information: the resource identifier of the trigger resource and a request status. On the basis of this, Step S206 may be expressed as the following implementation forms:

if the request status indicates success, the CSE sets, according to the resource identifier, the trigger status as being confirmed by the bearer network or backoff-for-trigger;

if the request status indicates that the sending frequency of the trigger message exceeds a standard or indicates network overloading, the CSE sets, according to the resource identifier, the trigger status as backoff-for-trigger; and if the request status indicates one of the following information: a temporary error, an invalid load, an invalid device identifier, an invalid CSE identifier, non-authorized, invalid validity time, service unavailability and quota exceeding, the CSE sets, according to the resource identifier, the trigger status as failure.

When the trigger status is backoff-for-trigger and the first attribute includes backoff time, the CSE starts a timer, and when the timer reaches the backoff time, the trigger request is re-sent.

Furthermore, when the request status indicates success, the CSE updates the first attribute according to a received trigger sending report sent by the network element of the bearer network, wherein the trigger sending report carries the following information: the resource identifier of the trigger resource and a sending result of the trigger message. In this case, when the sending result indicates success, the trigger status is set as success.

An termination of a trigger process may be embodied in the following aspects: when the trigger status is one of success, indicating that the bearer network has already confirmed and backoff-for-trigger, the CSE deletes the trigger resource after establishing the connection with the application or sending data to be sent, to the application.

When the sending result indicates one of the following information: expiration of the trigger message (that is, the validity time of the trigger message expires), a temporary error and incapability of sending, the trigger status is set as failure. When the trigger status is set as failure, the CSE deletes the trigger resource or re-sends the trigger request.

Optionally, the trigger request further carries at least one of the following information: validity time and a priority indicator.

In the embodiment, after the trigger status in the first attribute changes, the CSE sends a notification message to an AE.

In the embodiment, the resource identifier includes one of: a reference number and a trigger identifier (including, but not limited to, a name of the trigger resource).

Figure 3:
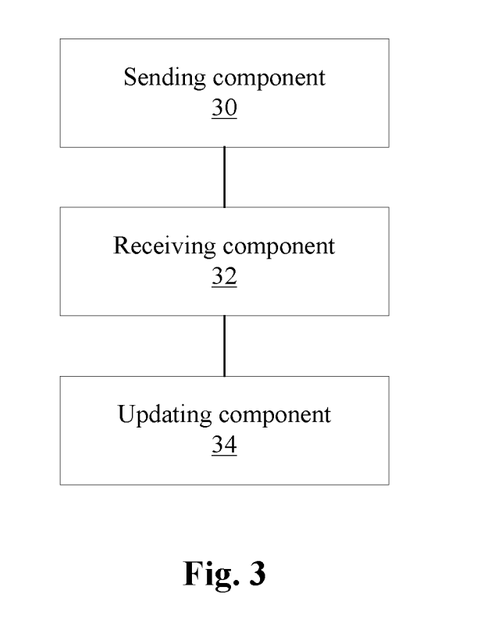
FIG. 3 is a structural block diagram of a device for trigger management of a CSE according to an embodiment of the disclosure.

In the embodiment, a device for trigger management of a CSE is also provided. The device may be applied to a CSE (the CSE may be a functional entity of an infrastructure node (such as a service layer server), configured to manage sending of a trigger message to a bearer network, track a status of the trigger message and manage a trigger resource according to a policy of the bearer network). The device is configured to implement the above embodiment and example implementations. Those which have been illustrated will not be elaborated herein. Components involved in the device are illustrated below. Just as a term 'component' used below, the combination of software and/or hardware with predetermined functions may be implemented. Although the device described by the following embodiment is better implemented by software, the implementation of hardware or the combination of software and hardware may be possible and conceived. FIG. 3 is a structural block diagram of a device for trigger management of a CSE according to an embodiment of the disclosure. As shown in FIG. 3, the device includes:

a sending component 30, configured to send a trigger request to a network element of a bearer network, wherein the trigger request carries the following information: a trigger message, an external identifier of the CSE, an identifier of a triggered device and a resource identifier of a trigger resource corresponding to the trigger request, and the trigger resource may include, but is not limited to, a resource configured to trigger establishment of connection between the CSE and a physical device;

a receiving component 32, connected with the sending component 30, and configured to receive a trigger response, which corresponds to the trigger request, sent by the network element of the bearer network; and an updating component 34, connected with the receiving component 32, and configured to update a first attribute of the trigger resource according to the trigger response.

Figure 4:
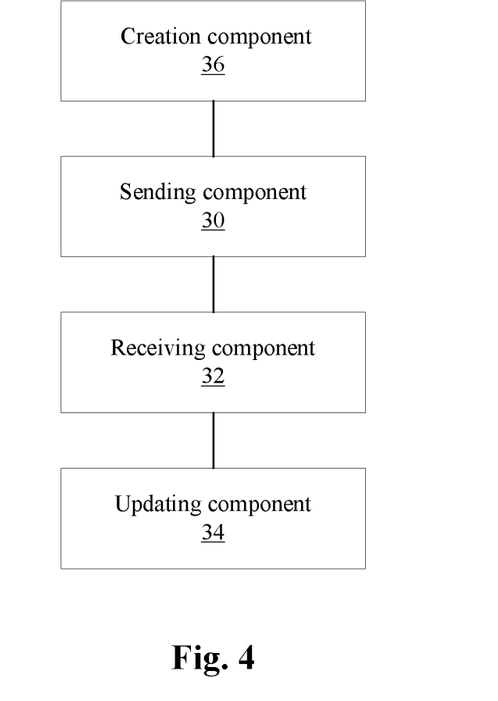
FIG. 4 is a structural block diagram of a device for trigger management of a CSE according to an example embodiment of the disclosure.

In the embodiment, as shown in FIG. 4, the device may further include: a creation component 36, connected with the sending component 30, and configured to create the trigger resource, and set the first attribute for the trigger resource. The first attribute includes: the identifier of the triggered device, the resource identifier of the trigger resource and a trigger status of the trigger resource.

In the embodiment, a CSE is also provided, which includes the device for trigger management of the CSE in the embodiment shown in FIG. 3 or FIG. 4.

Figure 5:
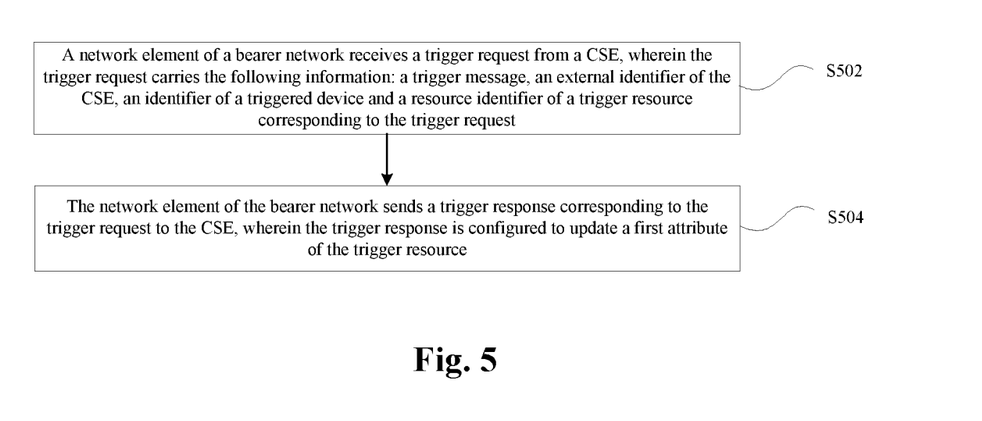
FIG. 5 is a flowchart of a method for trigger management of a CSE according to another embodiment of the disclosure.

In the embodiment, another method for trigger management of a CSE is also provided from a network element side of a bearer network. As shown in FIG. 5, the method includes the steps as follows.

Step S502: A network element of a bearer network receives a trigger request from a CSE, wherein the trigger request carries the following information: a trigger message, an external identifier of the CSE, an identifier of a triggered device (which may be a device identifier of a physical device where an application communicating with the CSE is located), and a resource identifier of a trigger resource corresponding to the trigger request.

Step S504: The network element of the bearer network sends a trigger response corresponding to the trigger request to the CSE, wherein the trigger response is used for updating a first attribute of the trigger resource.

In the embodiment, the first attribute includes, but is not limited to, the following information: the identifier of the triggered device, the resource identifier of the trigger resource and a trigger status of the trigger resource.

The trigger response carries, but is not limited to, the following information: the resource identifier of the trigger resource and a request status.

Figure 6:
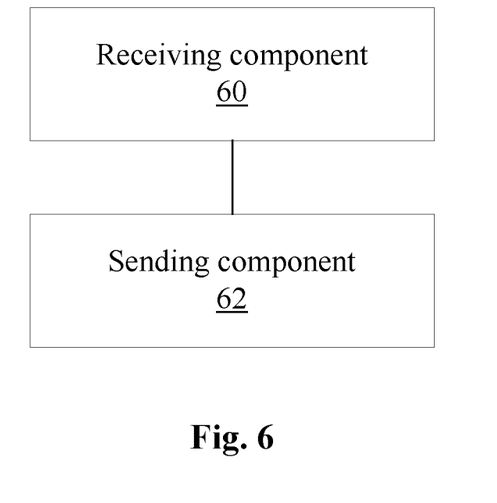
FIG. 6 is a structural block diagram of a device for trigger management of a CSE according to another embodiment of the disclosure.

Correspondingly, the embodiment also provides another device for trigger management of a CSE at a network element side of a bearer network. As shown in FIG. 6, the device includes:

a receiving component 60, configured to receive a trigger request from a CSE, wherein the trigger request carries the following information: a trigger message, an external identifier of the CSE, an identifier of a triggered device and a resource identifier of a trigger resource corresponding to the trigger request; and a sending component 62, connected to the receiving component 60, and configured to send a trigger response corresponding to the trigger request to the CSE, wherein the trigger response is configured to update a first attribute of the trigger resource.

In order to better understand the above embodiment, detailed illustrations will be made below with reference to preferred embodiments.

Embodiment 1

1. A CSE is intended to send data to an appointed application, and if the CSE does not establish connection with the application, the CSE needs to send a trigger message to a physical device, where the application is located, via a bearer network.

2. The CSE creates a resource "trigger", and sets attributes for the resource "trigger":
   1) Device-ID: an identifier of a triggered device;
   2) Trigger Status: a trigger status;
   3) Reference Number: a reference number or a trigger identifier;
   4) Validity Time: serving as an optional attribute and identifying validity time of a trigger message in a bearer network;
   5) Priority: serving as an optional attribute and identifying a priority indicator of a trigger message; and
   6) Backoff time: serving as an optional attribute and identifying backoff time for re-sending a trigger message.

3. The CSE sends a trigger request to a Machine Type Communication Internet-Working Function (MTC-IWF) of a network element of a bearer network, wherein the trigger request includes:
   1) CSE-Ext-ID: an external identifier of a CSE
   2) Device-ID: an identifier of a triggered device; and
   3) Reference Number: a reference number or a trigger identifier (the trigger identifier may include, but is not limited to, a name of a trigger resource);
   or
   1) CSE-Ext-ID: an external identifier of a CSE
   2) Device-ID: an identifier of a triggered device;
   3) Reference Number: a reference number or a trigger identifier; and
   4) Validity Time;
   or
   1) CSE-Ext-ID: an external identifier of a CSE
   2) Device-ID: an identifier of a triggered device;
   3) Reference Number: a reference number or a trigger identifier;
   4) Validity Time; and
   5) Priority.

4. After receiving the trigger request sent by the CSE, the MTC-IWF sends a trigger response to the CSE.

5. After receiving the trigger response sent by the MTC-IWF, the CSE executes an operation according to information contained in the trigger response, wherein the trigger response includes:
   1) Reference Number; and
   2) Request Status: a status of a trigger message.

5.1. If the request status in the trigger response indicates success, it is represented that the MTC-IWF confirms to receive the trigger request, and the CSE sets, according to the reference number or the trigger identifier, the corresponding attribute "Trigger Status" of the resource "trigger" as "the bearer network has already confirmed" or "backoff".

5.2. If the request status in the trigger response indicates that the sending frequency of the trigger message exceeds a standard or indicates network overloading, it is represented that the bearer network is in a network congestion status, the CSE sets, according to the reference number or the trigger identifier, the corresponding attribute "Trigger Status" of the resource "trigger" as "backoff". If the trigger resource contains backoff time, the CSE starts a timer T, the time of the timer is set as the backoff time, and after the timer reaches the backoff time, the trigger request is re-sent to the MTC-IWF.

5.3. If the request status in the trigger response indicates an invalid load (for instance, a load length in a signalling exceeds a maximum value implemented by the bearer network), or an invalid device identifier (such as a device identifier which cannot be recognized by the bearer network), or an invalid CSE identifier (such as a CSE identifier which cannot be recognized by the bearer network), or non-authorized (for instance, the CSE does not have a permission to send a trigger request), or service unavailability (for instance, the device does not support receiving of the trigger request), or quota exceeding (for instance, the trigger message sent by the CSE has exceeded a maximum amount), the CSE sets, according to the reference number or the trigger identifier, the corresponding attribute "Trigger Status" of the resource "trigger" as "failure".

6. If the received trigger response indicates "success", the CSE also needs to execute an operation according to a received trigger sending report sent by the MTC-IWF. The trigger sending report includes:
   1) a reference number or a trigger identifier (the trigger identifier may include, but is not limited to, a name of a trigger resource); and
   2) a sending result.

6.1. If the sending result in the trigger sending report indicates "success", the CSE sets, according to the reference number or the trigger identifier, the corresponding attribute "Trigger Status" of the resource "trigger" as "success".

6.2. If the sending result in the trigger sending report indicates "expiration", or "incapability of sending" (due to, for instance, disconnection of the device from the bearer network), the CSE sets, according to the reference number or the trigger identifier, the corresponding attribute "Trigger Status" of the resource "trigger" as "failure".

7. If the attribute "Trigger Status" of the resource "trigger" is "failure", the CSE deletes the resource or immediately re-sends a trigger request to the MTC-IWF, and if the attribute "Trigger Status" of the resource "trigger" is "success" or "backoff" or "the bearer network has already confirmed", the CSE deletes the resource after establishing connection with the application or sending the data, to be sent, to the application.

Embodiment 2

1. A CSE is intended to send data to an appointed application, and if the CSE does not establish connection with the application, the CSE needs to send a trigger message to a physical device, where the application is located, via a bearer network.

2. The CSE creates a resource "trigger", and sets attributes for the resource "trigger":
   1) Device-ID: an identifier of a triggered device;
   2) Trigger Status: a trigger status; and
   3) Reference Number: a reference number or a trigger identifier (the trigger identifier may include, but is not limited to, a name of a trigger resource).

3. The CSE creates a resource "trigger policy", and sets attributes for the resource "trigger policy":
   1) Validity Time: validity time of a trigger message in a bearer network;
   2) Priority: a priority indicator of a trigger message; and
   3) Backoff time: backoff time for re-sending a trigger message.

4. The CSE sends a trigger request to an MTC-IWF of a network element of a bearer network, wherein the trigger request includes:
   1) CSE-Ext-ID: an external identifier of a CSE
   2) Device-ID: an identifier of a triggered device; and
   3) Reference Number: a reference number or a trigger identifier (the trigger identifier may include, but is not limited to, a name of a trigger resource);
   or
   1) CSE-Ext-ID: an external identifier of a CSE
   2) Device-ID: an identifier of a triggered device;
   3) Reference Number: a reference number or a trigger identifier; and
   4) Validity Time;
   or
   1) CSE-Ext-ID: an external identifier of a CSE
   2) Device-ID: an identifier of a triggered device;
   3) Reference Number: a reference number or a trigger identifier;
   4) Validity Time; and
   5) Priority.

5. After receiving the trigger request sent by the CSE, the MTC-IWF sends a trigger response to the CSE.

6. After receiving the trigger response, which corresponds to the trigger request, sent by the network element of the bearer network, the CSE executes an operation according to information in the trigger response, wherein the trigger response includes:
   1) Reference Number; and
   2) Request Status: a status of a trigger message.

6.1. If the request status in the trigger response indicates "success", it is represented that the MTC-IWF confirms to receive the trigger request, and the CSE sets, according to the reference number or the trigger identifier, the corresponding attribute "Trigger Status" of the resource "trigger" as "the bearer network has already confirmed" or "backoff".

6.2. If the request status in the trigger response indicates that the sending frequency of the trigger message exceeds a standard or indicates network overloading, it is represented that the bearer network is in a network congestion status, the CSE sets, according to the reference number or the trigger identifier, the corresponding attribute "Trigger Status" of the resource "trigger" as "backoff". If the trigger resource contains backoff time, the CSE starts a timer T, the time of the timer is set as the backoff time, and after the timer reaches the backoff time, the trigger request is re-sent to the MTC-IWF.

6.3. If the request status in the trigger response indicates an invalid load (for instance, a load length in a signalling exceeds a maximum value implemented by the bearer network), or an invalid device identifier (such as a device identifier which cannot be recognized by the bearer network), or an invalid CSE identifier (such as a CSE identifier which cannot be recognized by the bearer network), or non-authorized (for instance, the CSE does not have a permission to send a trigger request), or invalid validity time (for instance, the validity time provided by the CSE has expired), or service unavailability (for instance, the device does not support receiving of the trigger request), or quota exceeding (for instance, the trigger message sent by the CSE has exceeded a maximum amount), the CSE sets, according to the reference number or the trigger identifier, the corresponding attribute "Trigger Status" of the resource "trigger" as "failure".

7. If the received trigger response indicates "success", the CSE also needs to execute an operation according to a received trigger sending report sent by the MTC-IWF. The trigger sending report includes:

1) a reference number or a trigger identifier; and
2) a sending result.

7.1. If the sending result in the trigger sending report indicates "success", the CSE sets, according to the reference number or the trigger identifier, the corresponding attribute "Trigger Status" of the resource "trigger" as "success".

7.2. If the sending result in the trigger sending report indicates "expiration", or "incapability of sending" (due to, for instance, disconnection of the device from the bearer network), the CSE sets, according to the reference number or the trigger identifier, the corresponding attribute "Trigger Status" of the resource "trigger" as "failure".

8. If the attribute "Trigger Status" of the resource "trigger" is "failure", the CSE deletes the resource or immediately re-sends a trigger request to the MTC-IWF, and if the attribute "Trigger Status" of the resource "trigger" is "success" or "backoff" or "the bearer network has already confirmed", the CSE deletes the resource after establishing connection with the application or sending the data, to be sent, to the application.

Embodiment 3

1. An AE sends a device trigger request or a trigger resource creation request to a CSE.

2. The CSE creates a resource "trigger", and sets attributes for the resource "trigger":
   1) Device-ID: an identifier of a triggered device;
   2) Trigger Status: a trigger status; and
   3) Reference Number: a reference number or a trigger identifier.

3. The CSE creates a resource "trigger policy", and sets attributes for the resource "trigger policy":
   1) Validity Time: validity time of a trigger message in a bearer network;
   2) Priority: a priority indicator of a trigger message; and
   3) Backoff time: backoff time for re-sending a trigger message.

4. The CSE sends a trigger request to an MTC-IWF of a network element of a bearer network, wherein the trigger request includes:
   1) CSE-Ext-ID: an external identifier of a CSE
   2) Device-ID: an identifier of a triggered device; and
   3) Reference Number: a reference number or a trigger identifier;
   or
   1) CSE-Ext-ID: an external identifier of a CSE
   2) Device-ID: an identifier of a triggered device;
   3) Reference Number: a reference number or a trigger identifier; and
   4) Validity Time;
   or
   1) CSE-Ext-ID: an external identifier of a CSE
   2) Device-ID: an identifier of a triggered device;
   3) Reference Number: a reference number or a trigger identifier;
   4) Validity Time; and
   5) Priority.

5. After receiving the trigger request sent by the CSE, the MTC-IWF sends a trigger response to the CSE.

6. After receiving the trigger response, which corresponds to the trigger request, sent by the network element of the bearer network, the CSE executes an operation according to information in the trigger response, wherein the trigger response includes:

1) Reference Number; and
2) Request Status: a status of a trigger message.

6.1. If the request status in the trigger response indicates "success", it is represented that the MTC-IWF confirms to receive the trigger request, and the CSE sets, according to the reference number or the trigger identifier, the corresponding attribute "Trigger Status" of the resource "trigger" as "the bearer network has already confirmed" or "backoff".

6.2. If the request status in the trigger response indicates that the sending frequency of the trigger message exceeds a standard or indicates network overloading, it is represented that the bearer network is in a network congestion status, the CSE sets, according to the reference number or the trigger identifier, the corresponding attribute "Trigger Status" of the resource "trigger" as "backoff". If the trigger resource contains backoff time, the CSE starts a timer T, the time of the timer is set as the backoff time, and after the timer reaches the backoff time, the trigger request is re-sent to the MTC-IWF.

6.3. If the request status in the trigger response indicates an invalid load (for instance, a load length in a signalling exceeds a maximum value implemented by the bearer network), or an invalid device identifier (such as a device identifier which cannot be recognized by the bearer network), or an invalid CSE identifier (such as a CSE identifier which cannot be recognized by the bearer network), or non-authorized (for instance, the CSE does not have a permission to send a trigger request), or invalid validity time (for instance, the validity time provided by the CSE has expired), or service unavailability (for instance, the device does not support receiving of the trigger request), or quota exceeding (for instance, the trigger message sent by the CSE has exceeded a maximum amount), the CSE sets, according to the reference number or the trigger identifier, the corresponding attribute "Trigger Status" of the resource "trigger" as "failure".

7. If the received trigger response indicates "success", the CSE also needs to execute an operation according to a received trigger sending report sent by the MTC-IWF. The trigger sending report includes:
   1) a reference number or a trigger identifier; and
   2) a sending result.

7.1. If the sending result in the trigger sending report indicates "success", the CSE sets, according to the reference number or the trigger identifier, the corresponding attribute "Trigger Status" of the resource "trigger" as "success".

7.2. If the sending result in the trigger sending report indicates "expiration", or "incapability of sending" (due to, for instance, disconnection of the device from the bearer network), the CSE sets, according to the reference number or the trigger identifier, the corresponding attribute "Trigger Status" of the resource "trigger" as "failure".

8. After the attribute "Trigger Status" of the resource "trigger" changes, the CSE sends a notification message to the AE, the notification message containing "Trigger Status".

In conclusion, the embodiments of the disclosure achieve the benefits as follows. The technical problem in the related art that M2M communication does not provide a solution of correspondingly triggering connection between a device and a service layer server yet is solved, thereby achieving the device trigger management of a service layer.

In another embodiment, software is also provided. The software is configured to execute the technical solution described in the above embodiments and the example implementations.

In another embodiment, a storage medium is also provided. The software is stored in the storage medium. The storage medium includes, but is not limited to, an optical disk, a floppy disk, a hard disk, an erasable memory and the like.

Obviously, those skilled in the art shall understand that all components or all steps in the disclosure can be implemented using a general calculation device, can be centralized on a single calculation device or can be distributed on a network composed of a plurality of calculation devices. Optionally, they can be implemented using executable program codes of the calculation devices. Thus, they can be stored in a storage device and executed by the calculation devices, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the spirit and principle of the disclosure shall fall within the protection scope of the disclosure.

INDUSTRIAL APPLICABILITY

The technical solution provided by the disclosure can be applied to a trigger management process of a CSE. In a technical way that the CSE sends a trigger request to a network element of a bearer network and sets an attribute of a trigger resource according to a trigger response fed back by the network element of the bearer network, the technical problem in the related art that M2M communication does not provide a solution of correspondingly triggering connection between a device and a service layer server yet is solved, thereby achieving the device trigger management of a service layer.

What is claimed is:

1. A method for trigger management of a Common Service Entity (CSE), comprising:
   sending, by the CSE, a trigger request to a network element of a bearer network, wherein the trigger request carries the following information: a trigger message, an external identifier of the CSE, an identifier of a triggered device and a resource identifier of a trigger resource corresponding to the trigger request;
   receiving, by the CSE, a trigger response, which corresponds to the trigger request, sent by the network element of the bearer network; and
   updating, by the CSE, a first attribute of the trigger resource according to the trigger response.

2. The method as claimed in claim 1, wherein before the CSE sends the trigger request to the network element of the bearer network, the method comprises:
   creating, by the CSE, the trigger resource, and setting, by the CSE, the first attribute for the trigger resource, wherein the first attribute comprises at least one of: the identifier of the triggered device, the resource identifier of the trigger resource, and a trigger status of the trigger resource.

3. The method as claimed in claim 1, wherein the trigger request further carries at least one of the following information: validity time and a priority indicator; or the resource identifier of the trigger resource comprises one of: a reference number, and a name of the trigger resource, wherein the reference number is a set of serial numbers used for uniquely identifying the trigger resource.

4. The method as claimed in claim 2, wherein the first attribute further comprises at least one of: validity time of the trigger message in the bearer network, a priority indicator of the trigger message, and backoff time for re-sending the trigger message;
   or further comprising: creating, by the CSE, a trigger policy resource, and setting, by the CSE, a second attribute for the trigger policy resource, wherein the trigger policy resource is a common resource of the trigger resource, and the second attribute comprises: validity time of the trigger message in the bearer network, a priority indicator of the trigger message, and backoff time for re-sending the trigger message;
   or the trigger response carries the following information: the resource identifier of the trigger resource and a request status.

5. The method as claimed in claim 2, further comprising:
   after the trigger status changes, sending, by the CSE, a notification message to an Application Entity (AE).

6. The method as claimed in claim 4, wherein updating, by the CSE, the first attribute of the trigger resource according to the trigger response comprises:
   when the request status indicates success, setting, by the CSE according to the resource identifier, the trigger status as being confirmed by the bearer network or backoff-for-trigger; and
   when the request status indicates that a sending frequency of the trigger message exceeds a standard or when the request status indicates network overloading, setting, by the CSE according to the resource identifier, the trigger status as backoff-for-trigger.

7. The method as claimed in claim 4, wherein updating, by the CSE, the first attribute of the trigger resource according to the trigger response comprises:
   setting, by the CSE according to the resource identifier, the trigger status as failure when the request status indicates one of the following information: a temporary error, an invalid load, an invalid device identifier, an invalid CSE identifier, non-authorized, invalid validity time, service unavailability and quota exceeding.

8. The method as claimed in claim 6, further comprising: when the trigger status is backoff-for-trigger and the first attribute comprises backoff time, starting, by the CSE, a timer, and when the timer reaches the backoff time, re-sending, by the CSE, the trigger request.

9. The method as claimed in claim 6, wherein updating, by the CSE, the first attribute of the trigger resource according to the trigger response comprises:
   when the request status indicates success, updating, by the CSE, the first attribute according to a received trigger sending report sent by the network element of the bearer network.

10. The method as claimed in claim 9, wherein the trigger sending report carries the following information:
    the resource identifier of the trigger resource and a sending result of the trigger message.

11. The method as claimed in claim 10, wherein updating, by the CSE, the first attribute according to the received trigger sending report sent by the network element of the bearer network comprises: when the sending result indicates success, setting, by the CSE, the trigger status as success;

or setting, by the CSE, the first attribute according to the received trigger sending report sent by the network element of the bearer network comprises: setting, by the CSE, the trigger status as failure when the sending result indicates one of the following information: expiration of the trigger message, a temporary error and incapability of sending.

12. The method as claimed in claim 11, further comprising:

when the trigger status is set as failure, deleting, by the CSE, the trigger resource or re-sending the trigger request.

13. A method for trigger management of a Common Service Entity (CSE) of a service layer, comprising:

receiving, by a network element of a bearer network, a trigger request from a CSE, wherein the trigger request carries the following information: a trigger message, an external identifier of the CSE, an identifier of a triggered device and a resource identifier of a trigger resource corresponding to the trigger request; and sending, by the network element of the bearer network, a trigger response corresponding to the trigger request to the CSE, wherein the trigger response is used for updating a first attribute of the trigger resource.

14. The method as claimed in claim 13, wherein the first attribute comprises at least one of:

a device identifier of the triggered device, the resource identifier of the trigger resource, a trigger status of the trigger resource.

15. The method as claimed in claim 13, wherein the trigger response carries the following information:

the resource identifier of the trigger resource and a request status.

16. A device for trigger management of a Common Service Entity (CSE), applied to a CSE, the device comprising:

a sending component, configured to send a trigger request to a network element of a bearer network, wherein the trigger request carries the following information: a trigger message, an external identifier of the CSE, an identifier of a triggered device and a resource identifier of a trigger resource corresponding to the trigger request;

a receiving component, configured to receive a trigger response, which corresponds to the trigger request, sent by the network element of the bearer network; and an updating component, configured to update a first attribute of the trigger resource according to the trigger response.

17. The device as claimed in claim 16, further comprising:

a creation component, configured to create the trigger resource, and set the first attribute for the trigger resource, wherein the first attribute comprises at least one of: the identifier of the triggered device, the resource identifier of the trigger resource, and a trigger status of the trigger resource.

18. A Common Service Entity (CSE), comprising: the device as claimed in claim 16.

19. A device for trigger management of a Common Service Entity (CSE), comprising:

a receiving component, configured to receive a trigger request from a CSE, wherein the trigger request carries the following information: a trigger message, an external identifier of the CSE, an identifier of a triggered device and a resource identifier of a trigger resource corresponding to the trigger request; and a sending component, configured to send a trigger response corresponding to the trigger request to the CSE, wherein the trigger response is used for updating a first attribute of the trigger resource.

20. A network element of a bearer network, comprising: the device as claimed in claim 19.

* * * * *